US012655895B2

(12) United States Patent
Hirota et al.

(10) Patent No.: US 12,655,895 B2
(45) Date of Patent: Jun. 16, 2026

(54) POWERTRAIN OF VEHICLE

(71) Applicant: GKN Automotive Limited,
Birmingham (GB)

(72) Inventors: Isao Hirota, Tochigi (JP); **Yousuke
Kawai, Tochigi (JP); Toru Funane,**
Tochigi (JP); Kazutaka Kawata,
Tochigi (JP)

(73) Assignee: GKN Automotive Limited,
Birmingham (GB)

( * ) Notice: Subject to any disclaimer, the term of this
patent is extended or adjusted under 35
U.S.C. 154(b) by 0 days.

(21) Appl. No.: 18/975,529

(22) Filed: Dec. 10, 2024

(65) Prior Publication Data

US 2025/0102052 A1 Mar. 27, 2025

Related U.S. Application Data

(63) Continuation of application No.
PCT/JP2022/041440, filed on Nov. 7, 2022.

(51) Int. Cl.
F16H 48/24 (2006.01)
B60K 1/00 (2006.01)
(Continued)

(52) U.S. Cl.
CPC ............. F16H 48/24 (2013.01); F16H 48/22
(2013.01); B60K 2001/001 (2013.01);
(Continued)

(58) Field of Classification Search
CPC .......... F16H 48/22; F16H 48/24; F16H 48/28;
F16H 2048/282
See application file for complete search history.

(56) References Cited

U.S. PATENT DOCUMENTS 5,037,362 A * 8/1991 Teraoka .................. F16H 48/08
475/233
6,066,063 A * 5/2000 Ishikawa ................. F16H 48/22
475/234
(Continued)

FOREIGN PATENT DOCUMENTS

JP H11132309 A 5/1999
JP 2001074123 A 3/2001
(Continued)

OTHER PUBLICATIONS

Written Opinion & International Search Report for PCT/JP2022/
041440 dated Jan. 17, 2023, (7 pages).
(Continued)

*Primary Examiner* — James J Taylor, II
(74) *Attorney, Agent, or Firm* — Reising Ethington P.C.

(57) ABSTRACT

A power transmission device is provided with a differential
case including an outer case for receiving torque and rotat-
ing about an axis and an inner case rotatable relative to the
outer case, a clutch member fixed to or engaged with the
outer case and structured so that the clutch member and the
inner case form a dog clutch, the clutch member transmitting
the torque from the outer case to the inner case when the dog
clutch is in mesh, and a differential gear set. The gear set
includes side gears rotatable about the axis and capable of
making a differential motion relative to each other and
forming a friction clutch in combination with the differential
case, and a pinion gear supported by the inner case as to
transmit the torque to the side gears and meshed with the
side gears to allow the differential motion.

4 Claims, 9 Drawing Sheets

(51) Int. Cl.
   *F16H 48/22*         (2006.01)
   *F16H 48/28*         (2012.01)
   *F16H 48/34*         (2012.01)

(52) U.S. Cl.
   CPC .. *F16H 2048/282* (2013.01); *F16H 2048/343*
                (2013.01); *F16H 2048/346* (2013.01)

(56)                References Cited

U.S. PATENT DOCUMENTS

| | | | | |
|---|---|---|---|---|
| 6,966,863 | B2 * | 11/2005 | Teraoka | H02K 7/108 |
| | | | | 475/154 |
| 10,781,904 | B2 * | 9/2020 | Hirota | F16H 48/14 |
| 11,333,231 | B2 * | 5/2022 | Nagaoka | B60K 17/35 |
| 2019/0056018 | A1 | 2/2019 | Inose | |
| 2021/0293316 | A1 | 9/2021 | Hirota et al. | |

FOREIGN PATENT DOCUMENTS

| | | | |
|---|---|---|---|
| JP | 2003322241 | A | 11/2003 |
| JP | 2011241939 | A | 12/2011 |
| JP | 2019049345 | A | 3/2019 |
| WO | WO2020129400 | A1 | 6/2020 |

OTHER PUBLICATIONS

English Translation—International Search Report for PCT/JP2022/
041440 dated Jan. 17, 2023, (2 pages).
JP Office Action for JP Application No. 2024-556859 dated Jan. 6,
2026 (8 pages).

* cited by examiner

POWERTRAIN OF VEHICLE

CROSS REFERENCE TO RELATED APPLICATIONS

This application is a continuation Application of PCT International Application No. PCT/JP2022/041440 filed on Nov. 7, 2022, the entire contents of which are incorporated herein by reference.

TECHNICAL FIELD

The disclosure herein relates to a power transmission device that may be applicable to a powertrain of an electric vehicle.

BACKGROUND

As right and left axles in a vehicle do not necessarily rotate in an equal speed, it is required to allow differential motion therebetween. To allow differential motion between these axles, a differential device is used.

While the difference device can effectually transmit torque to both the axles when both the wheels maintain traction, it fails to transmit torque if one wheel loses traction and differential motion of the other is still enabled. One of means for avoiding this situation is a so-called limited-slip differential (LSD). The LSD is for example provided with a friction clutch that starts operation in response to torque application and then works to limit the differential motion (torque-sensitive LSD).

There are various types of torque-sensitive LSDs. A cone-clutch type disclosed in Japanese Patent Application Publication 2019-49345 is capable of embodying an LSD with a simple structure, although it is difficult to expect a great limiting force on differential motion.

SUMMARY

LSDs can potentially provide the aforementioned advantages even for electric vehicles but are not used in general. The reason is that, when the electric vehicle decelerates, its motor works as a generator to regenerate excess energy, whereas an LSD without any particular design still exerts the limiting effect to waste energy even when decelerating. The present inventors have reached a power transmission device by which an LSD may be used in an electric vehicle.

According to an aspect, a power transmission device is provided with: a differential case including an outer case configured to receive torque and rotate about an axis and an inner case rotatable relative to the outer case; a clutch member fixed to or engaged with the outer case and so structured that the clutch member and the inner case form a dog clutch, the clutch member transmitting the torque from the outer case to the inner case when the dog clutch is in mesh; and a differential gear set including paired side gears respectively rotatable about the axis and capable of making a differential motion relative to each other, wherein a combination of each of the side gears and the differential case constitutes a friction clutch for limiting the differential motion, and a pinion gear so supported by the inner case as to transmit the torque to the side gears and so meshed with the side gears to allow the differential motion.

BRIEF DESCRIPTION OF THE DRAWINGS

The following detailed description of certain embodiments and best mode will be set forth with reference to the accompanying drawings, in which.

DETAILED DESCRIPTION

Exemplary embodiments will be described hereinafter with reference to the appended drawings. Throughout the following description and the appended claims, unless otherwise described, an axis means a rotation axis of a differential device, an axial direction means a direction parallel thereto and a radial direction means a direction perpendicular thereto. The distinction between front, rear, right and left are based on a state where a device at issue is installed in a vehicle, whereas any embodiments would be of course possible where front and rear, or right and left, were arbitrarily interchanged. Drawings are not necessarily made to scale and therefore it is particularly noted that dimensional relations are not limited to those drawn therein.

While a power transmission device according to the present embodiment is applicable to any type of vehicle, it may be applied to a powertrain of an electric vehicle in particular, which can regenerate and turn back energy to a rechargeable battery. The electric vehicle here is not limited to a pure electric vehicle but may be a so-called (plug-in) hybrid vehicle in which a rechargeable battery is used in combination with an internal combustion engine, or a hybrid fuel cell vehicle in which a fuel cell is used in combination with a rechargeable battery.

Figure 1A:
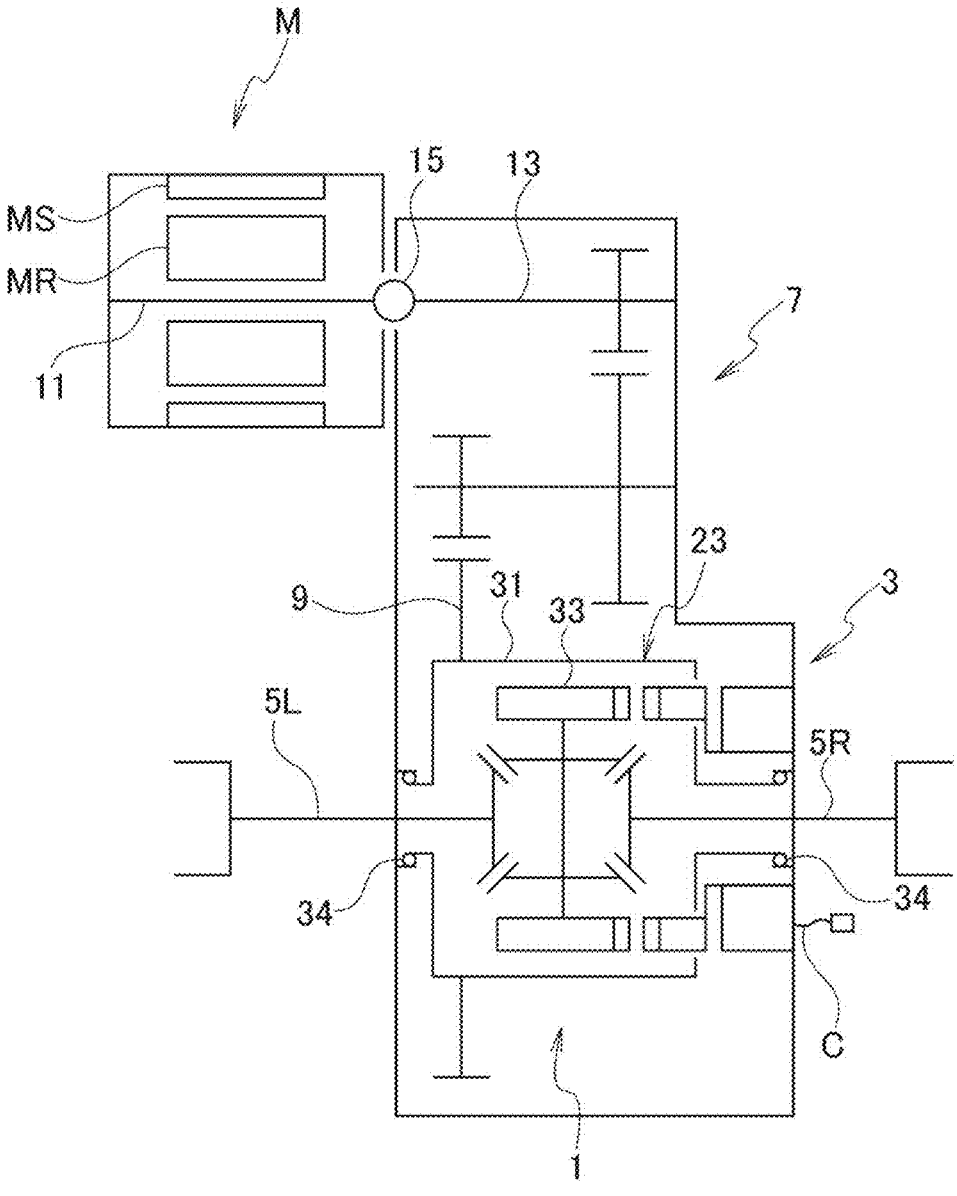
FIG. 1A is a schematic drawing showing a powertrain of an electric vehicle based on an example, where an electromagnetic solenoid is used for driving a clutch.

Referring to FIG. 1A for example, a powertrain of an electric vehicle is for example provided with an electric motor M as a power source, a reduction gear set 7 for reducing speed of a rotation (thus, multiplying its force), and a differential device 1 for outputting torque with allowing differential motion. The whole is housed in and supported by a housing.

The motor M is, although not necessarily limited to, provided with a stator MS fixed to a motor housing and a rotor MR coupled to and rotating with a shaft 11. In response to a high-frequency current applied by an electric power supply, the rotor MR generates torque relative to the stator MS and outputs the generated torque to the shaft 11.

While the shaft 11 may be led out of the motor housing and directly serve as an input shaft of the reduction gear set 7, a coupling 15 may be interposed between the shaft 11 and an input shaft 13. The drivetrain including the reduction gear set 7 and the differential device 1 is housed in and supported by a gear housing defining a chamber separated from a chamber of the motor housing. This structure helps to prevent high-frequency noise leakage because it electrically separates the motor M from the drivetrain. The gear housing may be formed in a unitary body with the motor housing, because the unitization helps weight reduction of the device as a whole, whereas these housings may be separate bodies alternatively.

In any case, the reduction gear set 7 is provided with one or plural stages of reduction gears and, with reducing the speed of the inputted rotation and in turn multiplying its torque, transmits the multiplied torque to the differential device 1. The differential device 1, by means of a ring gear 9 for example, meshes with the reduction gear set 7 and receives the torque, and further outputs the torque to a right axle 5R and a left axle 5L while allowing differential motion therebetween.

Figure 1B:
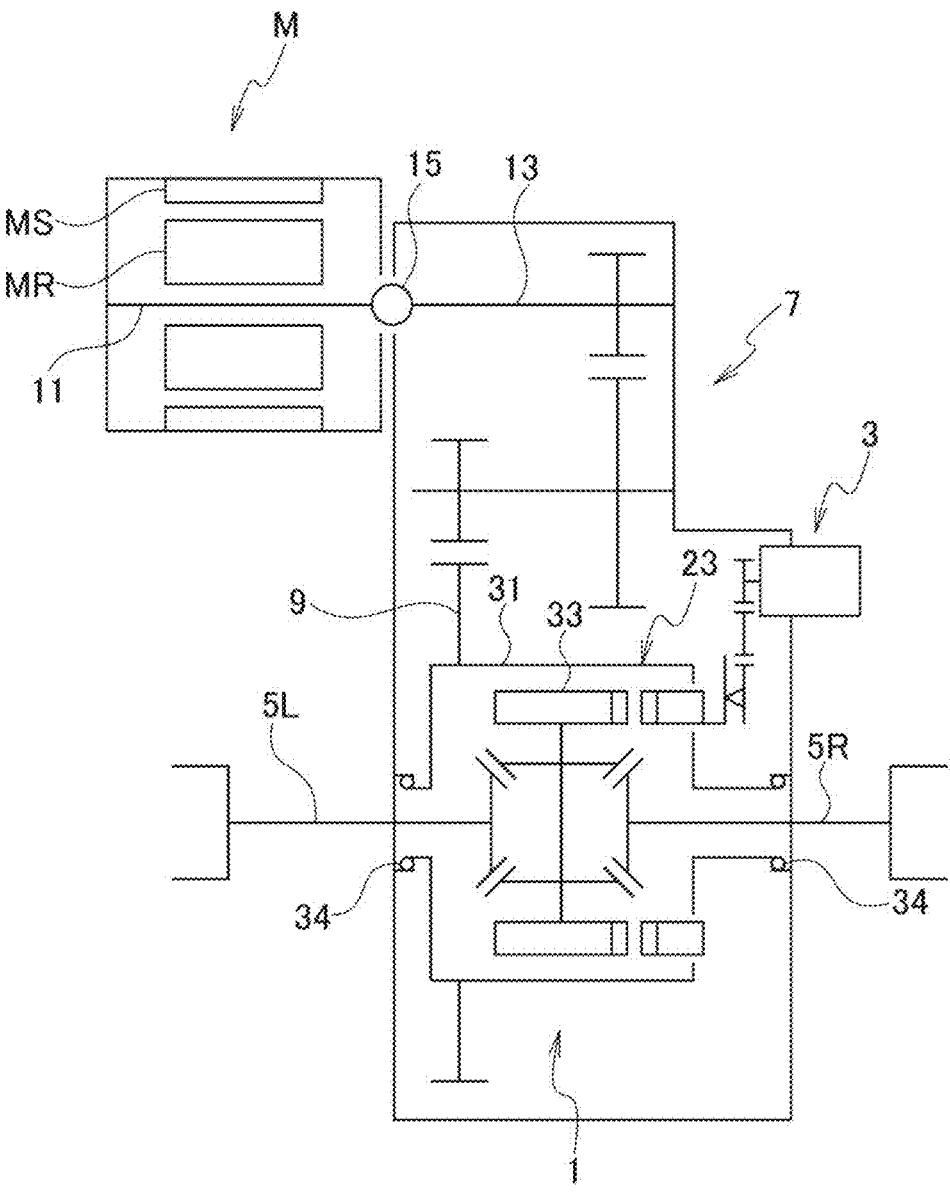
FIG. 1B is a schematic drawing showing a powertrain where a combination of a motor, a gear mechanism and a cam mechanism is used to drive the clutch.

The reduction gear set 7 may be formed of two or more parallel shafts as shown in FIG. 1A or 1B. In this case, the differential device 1 belongs to a third or fourth axis in the drivetrain. This structure helps to reduce the axial size of the drivetrain. It further provides freedom of design as respective elements in the power transmission device can be arranged without interference from the motor M.

Figure 1C:
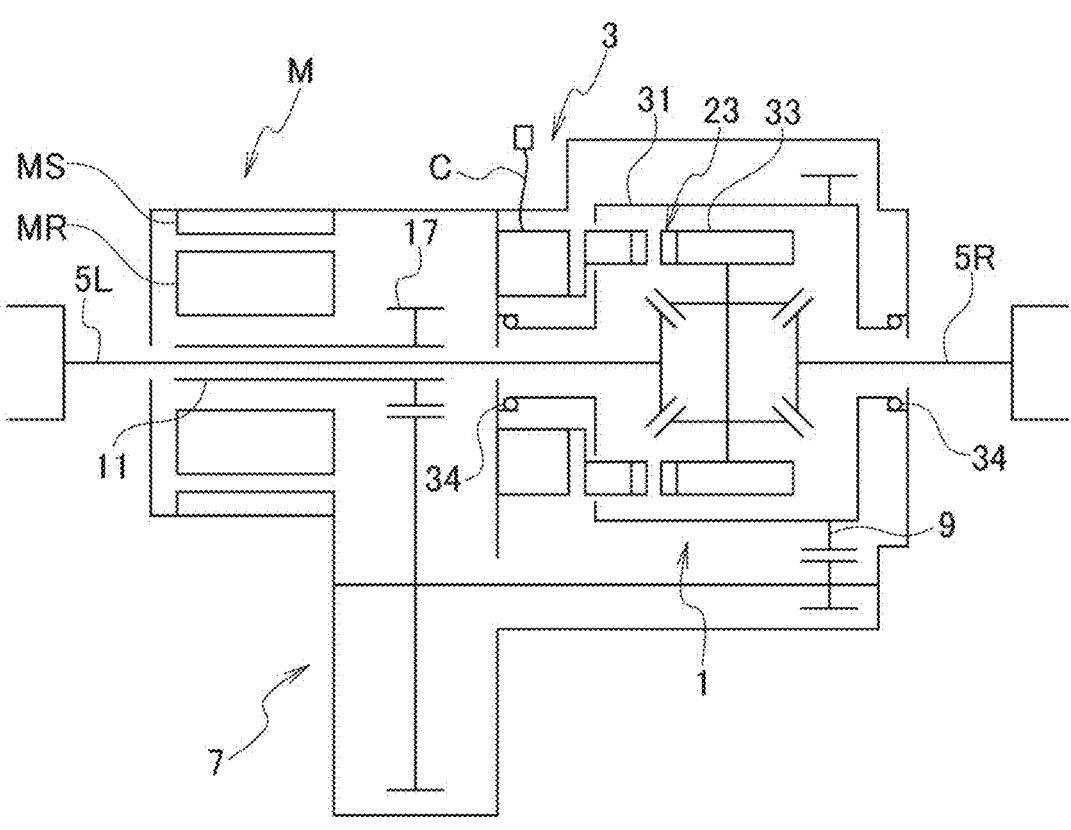
FIG. 1C is a schematic drawing showing a powertrain of an electric vehicle based on another example, where a power source is disposed coaxially with a differential.
Figure 1D:
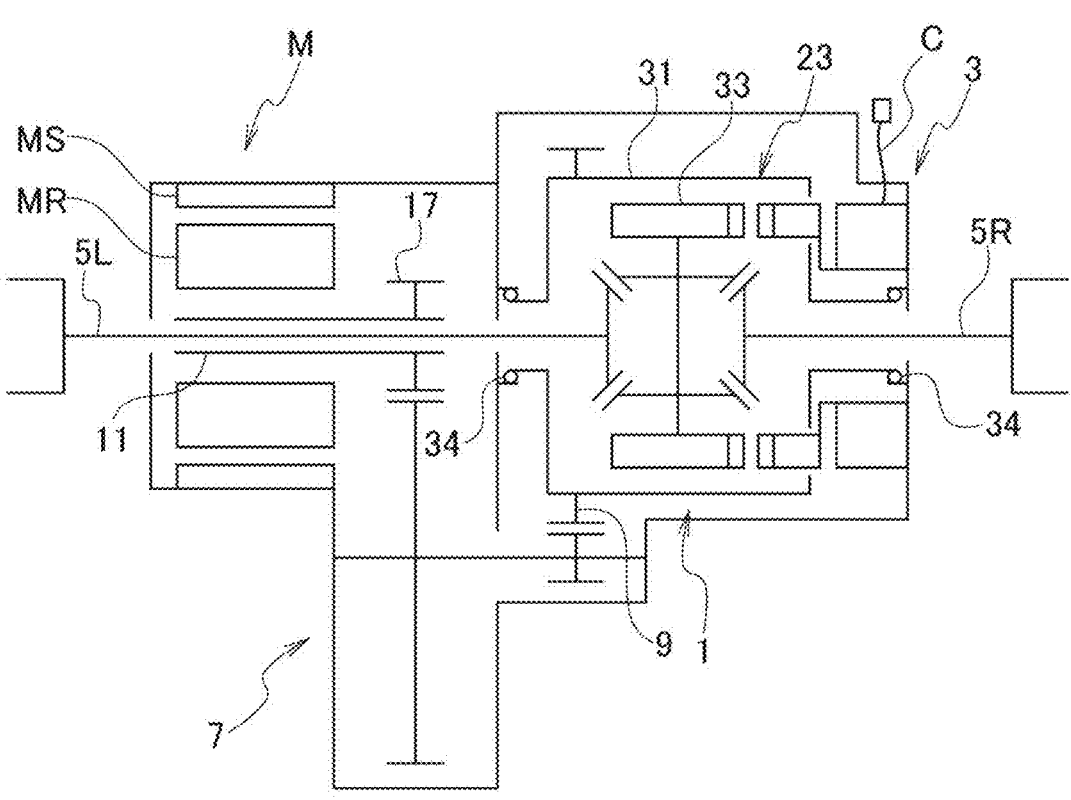
FIG. 1D is a schematic drawing showing a powertrain where the clutch arrangement is reversed from the example of FIG. 1C.

The arrangement illustrated in FIG. 1A or 1B, however, requires a considerable room in the radial direction. The arrangement illustrated in FIG. 1C or 1D is instead effective for reducing the radial size. In any of these examples, the motor M and the differential device 1 are adjacent to each other in the axial direction and also coaxial, and the shaft 11 of the motor M is hollow and the left axle 5L (or the right axle 5R instead) passes through the shaft 11 to the exterior. The reduction gear set 7 is on a single axis parallel to these shafts but nonetheless achieves sufficient speed reduction as it has doubled reduction gears as with the examples shown in FIGS. 1A and 1B. In the example shown in FIG. 1C, moreover, an actuator 3 can be disposed in a space held between the motor M and the differential device 1, which tends to be a dead space, and therefore the example is advantageous in terms of space saving. In contrast, the example shown in FIG. 1D is expected to operate more stably, as the motor M and the actuator 3 prone to magnetic flux interference are arranged apart.

Figure 1E:
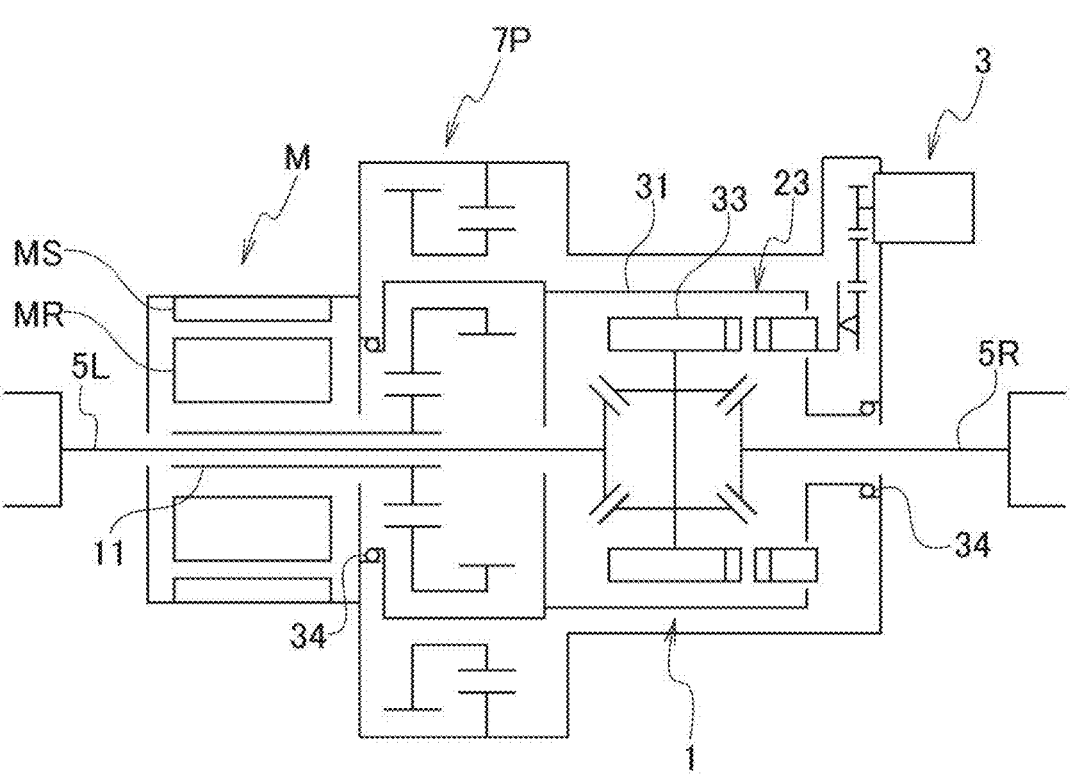
FIG. 1E is a schematic drawing showing a powertrain of an electric vehicle based on still another example, where a planetary gear is used in place of the example shown in FIG. 1B to reduce speed (multiply force) of an output by the power source.

Alternatively, a drivetrain with a planetary gear 7P is possible as shown in FIG. 1E. In the example shown therein, the outer gear is fixed to the gear housing, the sun gear is fixed to the input shaft, and the planetary carrier is coupled to the differential case of the differential device 1, thereby providing a large reduction ratio in torque transmission from the input shaft to the differential device 1. Of course, instead applicable is any other construction, such as using the outer gear for receiving input for example. As will be readily understood from FIG. 1E, use of the planetary gear does not require any large gear expanding radially outward as with FIGS. 1C and 1D.

Figure 2:
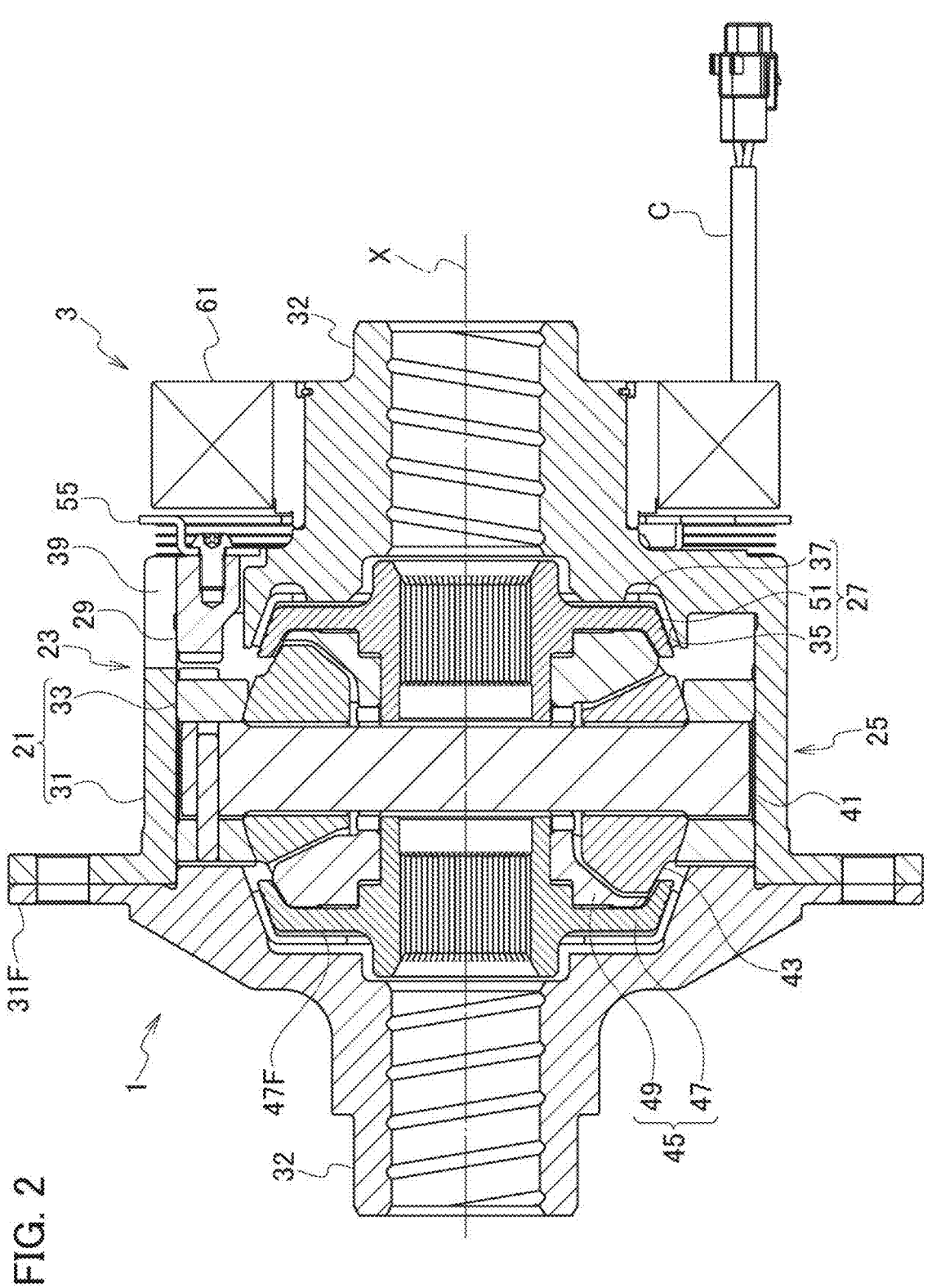
FIG. 2 is a sectional view of a differential device including in a power transmission device according to an embodiment.

Referring to FIG. 2 in combination with FIGS. 1A through 1E, a differential case 21 of the differential device 1 is provided with an outer case 31 for receiving the torque to rotate about an axis X and an inner case 33 fitting coaxially therein. The outer case 31 is, at both ends for example, provided with boss sections 32, and the gear housing is accordingly provided with bearings 34, thereby the outer case 31 is rotatably supported by the gear housing. The inner case 33 is rotatable relative to the outer case 31, whereas these cases are drivingly coupled together when the clutch 23 is in mesh so that the input torque is transmitted to the differential gear set 25. Specifically, the torque by the motor M is, only when the clutch 23 is in mesh, output through the differential gear set 25 to the axles 5R, 5L and used for moving the vehicle but is not output to any of the axles 5R, 5L when the clutch 23 is disengaged. On the other hand, when the vehicle is decelerating, the motor M could exert braking force and also regenerate excess energy when the clutch 23 is in mesh, but does not regenerate energy when it disengages.

The clutch 23 may be comprised of clutch teeth toothed on an end of the inner case 33 and a clutch member 29 having corresponding clutch teeth. The clutch member 29 is generally circular, and the clutch teeth are toothed on one face thereof and one or more legs project from the other face. The outer case 31 is provided with one or more openings 39 corresponding to these legs, which at least axially penetrate the outer case. The openings 39 may be further opened radially to help circulation of lubricant oil. The legs 29 respectively pass through the openings 39 and are exposed to the exterior of the outer case 31. The exposed legs may be further coupled with a ring plate 55 or such, which can help operation from the exterior. As the legs of the clutch member 29 are respectively engaged with the openings 39, the clutch member 29 is immovable relative to the outer case 31 in the circumferential direction, thereby receiving the torque, but is axially movable.

Operation of the clutch 23 is executed by the actuator 3 and is therefore carried out from the exterior of the drivetrain. To the actuator 3 applicable is, as shown in FIG. 2, an electromagnetic solenoid 61 that electromagnetically drives a plunger. The electromagnetic solenoid 61 is ring-shaped for example and slidably fits on a periphery of one of the boss sections 32 of the differential case 21 but is prevented from rotating. The plunger for example fits in an inner periphery of the electromagnetic solenoid and is movable axially, and is abutted against, engaged with or fixed to the clutch member 29, or a ring plate 55 coupled therewith. To the electromagnetic solenoid 61, a cable C is electrically connected, and the cable C is led out of the gear housing as shown in FIGS. 1A, 1C and 1D. When a current is applied from the exterior through the cable C to the electromagnetic solenoid 61, the plunger is axially driven so as to operate the clutch 23 via the ring plate 55.

Alternatively, instead of using the immovable solenoid 61 to drive the movable plunger, the electromagnetic solenoid 61 may be movable and driven by itself relative to any fixed member so as to operate the clutch 23.

Figure 3:
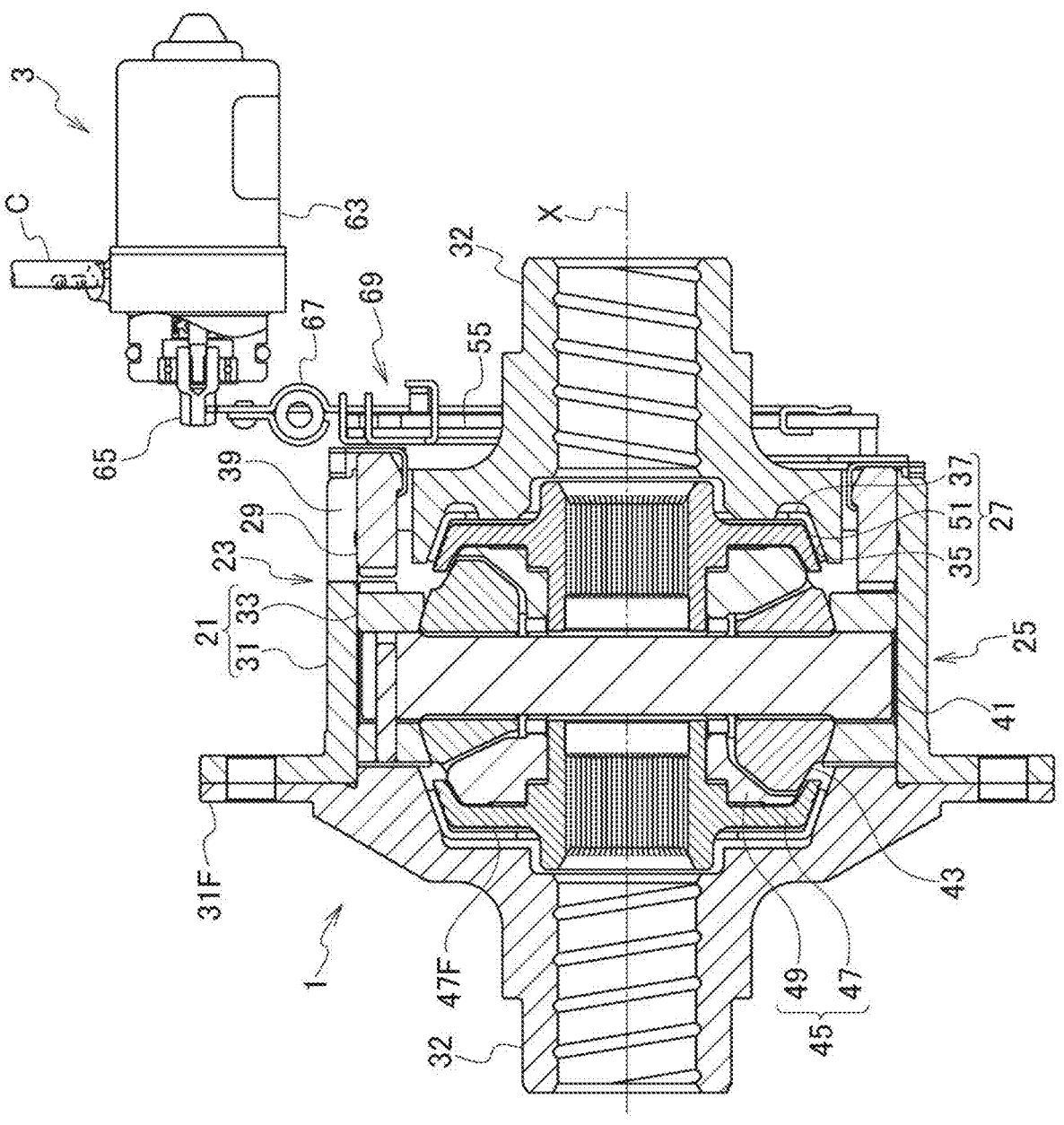
FIG. 3 is a sectional view of a differential device adapted for using a combination of a motor, a gear mechanism and a cam mechanism for driving the clutch.

Further, the actuator 3 is not limited to the electromagnetic solenoid but may be any arbitrary actuator device such as a hydraulic device, a pneumatic device or an electric motor. What is shown in FIG. 3 and schematically shown in FIGS. 1B and 1E is one of such examples, in which the actuator 3 is generally comprised of an electric motor 63, a gear mechanism 65, 67 and a cam structure 69. The gear mechanism is for example comprised of a pinion gear 65 rotated by the electric motor 63 and a gear ring 67 having an axis parallel therewith and meshing therewith. The gear ring 67 is larger in diameter than the pinion gear 65 to form a reduction gear mechanism. To increase the reduction ratio, any other gear may be interposed. The cam structure 69 is a mechanism for converting a rotational motion into a linear motion and is comprised of cam projections abutting against or formed on the gear ring 67, or cam balls rolling on the gear ring 67. When a current is applied through the cable C thereto, the gear ring 67 rotates and the cam structure 69 thus presses the plate 55 so that the actuator 3 can engage or disengage the clutch 23.

In the example shown in the drawing, the clutch member 29 itself is provided with the clutch teeth and meshes with the inner case 33, whereas the clutch member 29 may be a separate body from the clutch teeth. For example, any movable member axially movable but circumferentially fixed to the outer case 31 may be provided with the clutch teeth and the clutch member 29 may be slaved to the movable member. Alternatively, the outer case 31 itself or any member fixed thereto may be provided with the clutch teeth and the clutch member 29 may drive the inner case 33 to mesh them together. In addition, the clutch 23 may not be comprised of mutually meshing clutch teeth but instead may be comprised of any proper meshing structure such as a combination of lugs and corresponding grooves both elongated axially.

Referring mainly to FIGS. 2 and 3, the inner case 33 is coupled with the differential gear set 25. Pinon shafts 41 for example are coupled with the inner case 33 by means of inserted pins and a plurality of pinion gears 43 is rotatably supported by the pinion shafts 41. The pinion gears 43 mesh with right and left side gears 45, and the side gears 45 are respectively capable of coupling with the axles. For the coupling, these side gears may be provided with any structures such as splines on these internal peripheries.

The combination of an axially outer surface of each side gear 45 and a corresponding inner surface of the outer case 31 constitutes a friction clutch 27, which serves to limit differential motion between the side gears 45. The example in the drawing and the following description mainly relate to a bevel gear type and cone-clutch type LSD but a multi-plate clutch type or any other appropriate type is used in place of the cone clutch type. In the illustrated example, the internal surfaces of the outer case 31 constitute the friction clutches 27 but, if possible, internal surfaces of the inner case 33 in place of or in addition to the outer case 31 may constitute the friction clutches 27. In any case, the friction clutches 27 are disposed radially inward from, and arranged so as not to interfere with, the clutch member 29. Axial movement of the clutch member 29 does not affect the operation of the friction clutches 27 and the operation of the friction clutches 27 does not affect engagement of the clutch member 29. This structure makes efficient use of arrangement space limited in the differential device.

As the meshing reaction force created by the engagement of the gear teeth of the pinion gears 43 and the side gears 45 presses the side gears 45 axially outward, the force activates the friction clutches 27. As the applied torque increase, the thrust force increases. The function of limiting differential motion by the friction clutches 27 is torque-sensitive. To strengthen the effect, the friction surfaces 35 of the outer case 31 and the friction surfaces 51 of the side gears 45 may be respectively conical faces (specifically, these members constitute cone clutches) and further friction rings 37 may be interposed between the friction surfaces 35 and 51.

Figure 4:
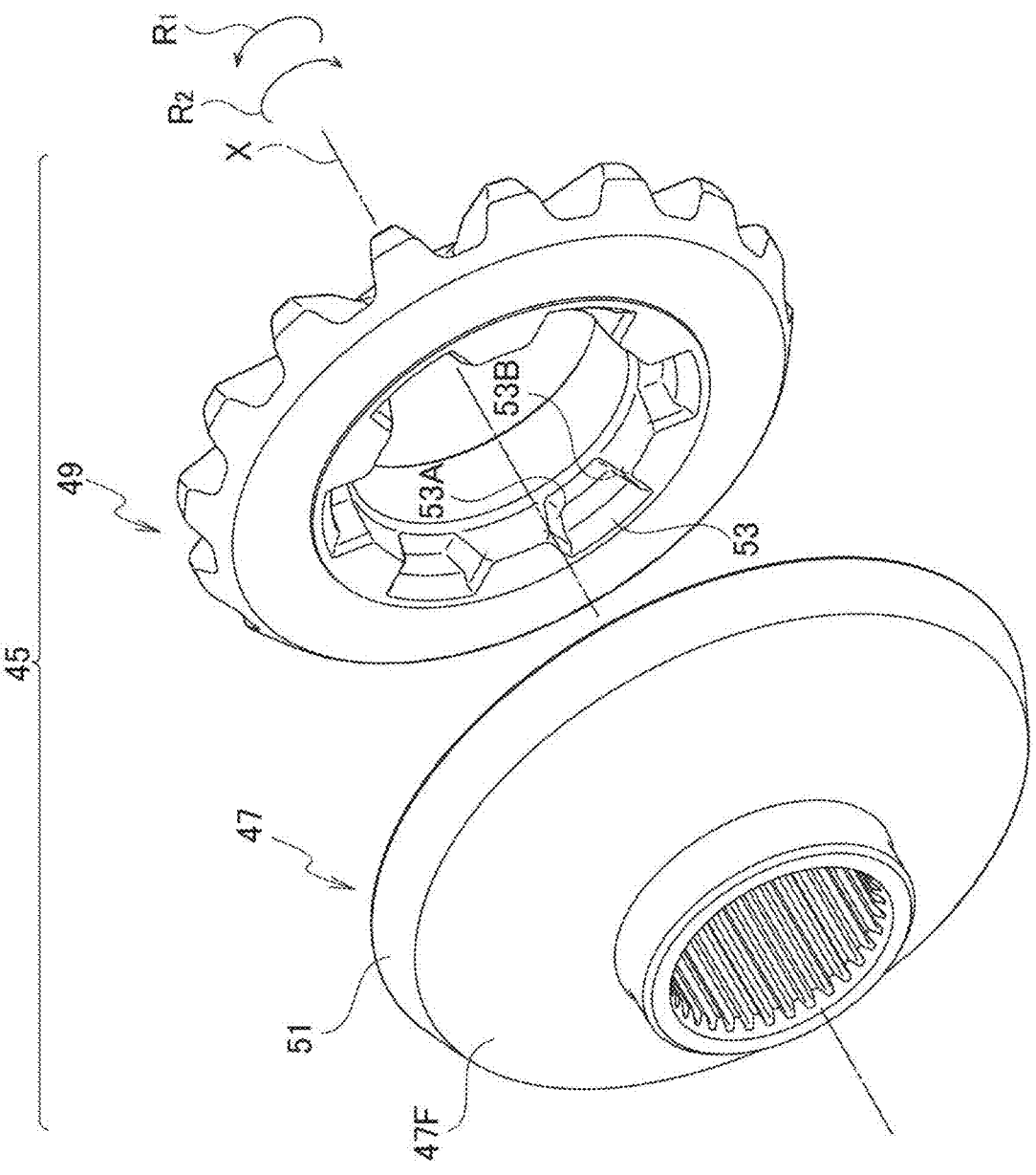
FIG. 4 is an exploded perspective view of a side gear comprised of a gear member and an output member.

Referring to FIG. 4 in combination with FIGS. 2 and 3, each side gear 45 may not be a unitary body but may be comprised of a gear member 49 for meshing with the pinion gears 43 and an output member 47 engaging and rotating unitarily therewith. The output member 47 may be used for coupling with the axle and is provided with a flange section 47F expanding radially outward to receive the gear member 49. The friction surface 51 may be formed on a radially outer rim of the flange section 47F.

Each gear member 49 has sockets 53 as depressions opened axially outward for engaging with the output member 47 and the output member 47 is provided with lugs corresponding thereto. While the relation between the sockets and the lugs may be reversed, in any case, the engagement structure transmits the torque between the gear member 49 and the output member 47 in both the forward rotation R1 and the reverse rotation R2.

Figure 5:
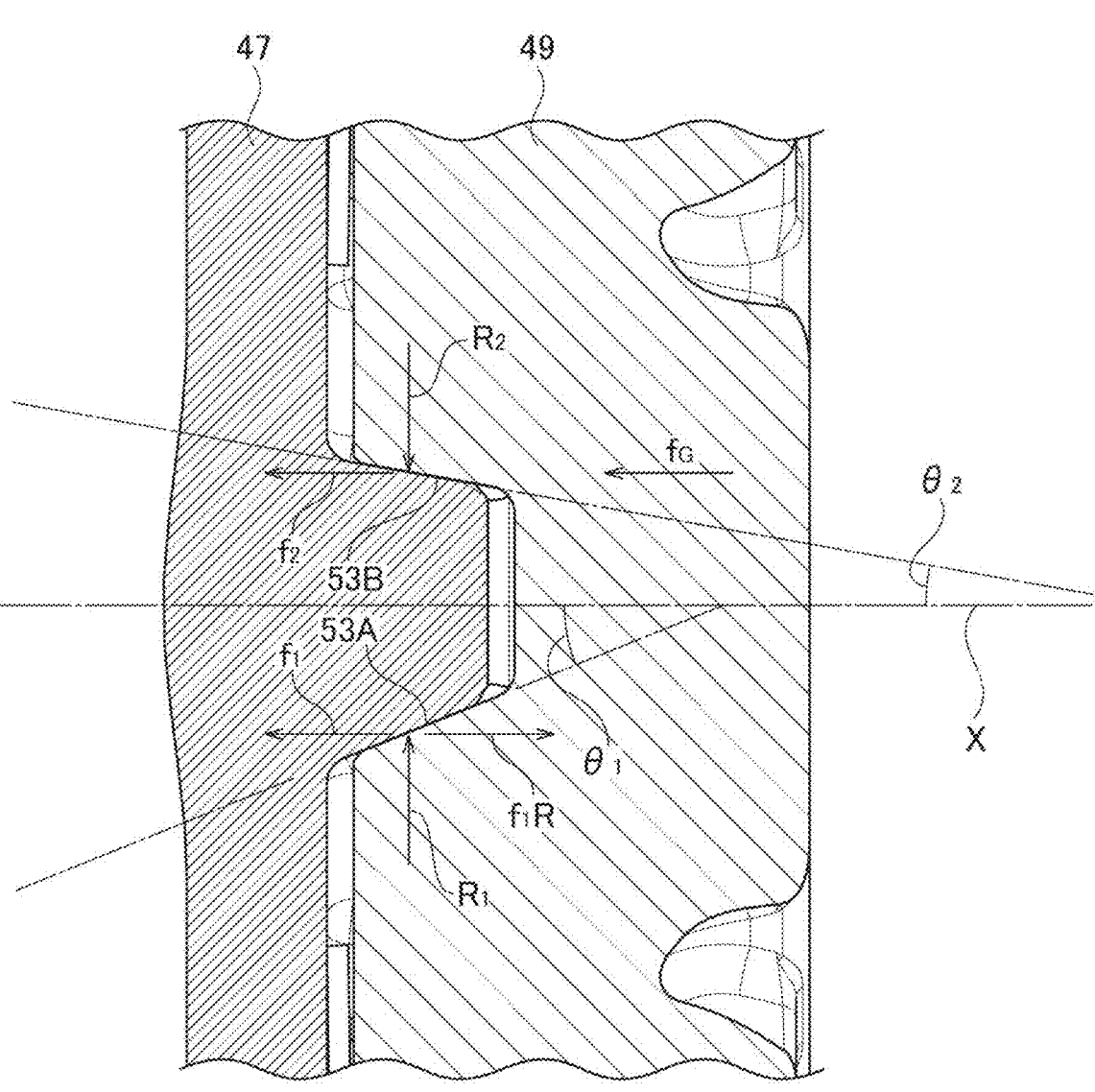
FIG. 5 is a partial plan sectional view of the side gear for showing engagement at a cam face.

Referring to FIG. 5 in combination with FIGS. 2 through 4, side faces 53A, 53B of each socket 53 may be inclined relative to the axial direction. Needless to say, side faces of each lug may be correspondingly inclined. The inclined side faces abutting against each other function as a cam for converting torque acting on the gear member 49 partly into a thrust force f1 or f2. The thrust force f1 or f2 presses the output members 47 axially outward to activate the friction clutches 27.

Inclination angles θ1, θ2 of the side faces 53A, 53B to the axis X can be independently set so that the thrust forces f1 and f2 can be independently increased or decreased. As these thrust forces can be larger than the meshing reaction forces in the differential gear, this structure can increase the capacity for limiting the differential motion by the friction clutches 27. By increasing the inclination angle θ1 of the side face 53A on which the torque in the forward direction R1 acts, it is possible to generate a larger thrust force f1 when torque is applied in a direction for accelerating the vehicle (drive direction), thereby generating a greater limiting force on the differential motion. By decreasing the inclination angle θ2 of the side face 53B on which the torque in the reverse direction R2 acts or by setting the angle to zero, it is possible to decrease the thrust force f2 or set it to zero when torque is applied in a direction for decelerating the vehicle (coast direction), thereby generating a smaller limiting force on the differential motion.

According to the present embodiment, because the differential device has a capacity for limiting differential motion, the transmission device therewith can transmit torque to the other even when one driving wheel loses traction. At a time of deceleration on the other hand, while the electric motor regenerates excess energy of the vehicle, then the differential device achieves a smaller limiting force on differential motion and energy loss due to the limiting function becomes also smaller, thereby achieving energy regeneration with a small loss. Further, in a case where energy inflow through the drivetrain is excessive relative to the capacity of the electric motor, the inflow can be cut by operating the clutch to intermit the power transmission and the device can therefore prevents excessive load on the electric motor, the regeneration circuit or the rechargeable battery. Moreover, as the speed difference between the clutch teeth just before and after the clutch operation is sufficiently small, abnormal noise and shock due to the operation are very small as compared with those generated by a disconnect device on a shaft.

Although certain exemplary embodiments are described above, modifications and variations of the embodiments will occur to those skilled in the art, in light of the above teachings.

What is claimed is:

1. A powertrain comprising:

an electric motor with a reduction gear set configured to output torque;

a differential case including an outer case having a ring gear meshing with the reduction gear set to receive the torque and rotate about an axis and an inner case rotatable relative to the outer case;

a clutch member fixed to or engaged with the outer case and so structured that the clutch member and the inner case form a dog clutch, the clutch member transmitting the torque from the outer case to the inner case when the dog clutch is in mesh; and a differential gear set including paired side gears respectively rotatable about the axis and capable of making a differential motion relative to each other, wherein a combination of each of the side gears and the outer case constitutes a friction clutch for limiting the differential motion, and a pinion gear so supported by the inner case as to transmit the torque to the side gears and so meshed with the side gears to allow the differential motion, wherein the outer case includes an opening passing through the outer case, overlapping a conical surface of the outer case that defines part of the friction clutch, engaging with the clutch member and having the clutch member at least partly exposed to an exterior of the outer case, and the friction clutch is disposed radially inward from the clutch member.

2. The powertrain of claim 1, wherein the friction clutch includes friction surfaces respectively on the side gears and respective conical surfaces of the outer case respectively facing the friction surfaces.

3. The powertrain of claim 2, wherein each of the side gears includes a gear member meshing with the pinion gear and an output member including a respective one of the friction surfaces, and the gear member and the output member mesh together at a cam face inclined relative to a circumferential direction, whereby the cam face converts the torque partly into a thrust force in an axial direction to press the respective one of the friction surfaces against the differential case.

4. The powertrain of claim 1, wherein the clutch member is so configured as to move axially to mesh with and depart from the inner case.

* * * * *